United States Patent [19]

Yamada et al.

[11] Patent Number: 4,862,208
[45] Date of Patent: Aug. 29, 1989

[54] INFORMATION TRANSMITTING DEVICE FOR CAMERA

[75] Inventors: Akira Yamada, Kanagawa; Ichiro Ohnuki, Tokyo, both of Japan

[73] Assignee: Canon Kabushiki Kaisha, Tokyo, Japan

[21] Appl. No.: 287,565

[22] Filed: Dec. 19, 1988

Related U.S. Application Data

[63] Continuation of Ser. No. 211,086, Jun. 21, 1988, abandoned, which is a continuation of Ser. No. 828,957, Feb. 12, 1986, abandoned.

[30] Foreign Application Priority Data

Feb. 14, 1985 [JP] Japan ................................. 60-027194

[51] Int. Cl.$^4$ ............................................. G03B 7/00
[52] U.S. Cl. .................................. 354/485; 354/286; 354/288
[58] Field of Search .................... 354/485, 286, 288

[56] References Cited

U.S. PATENT DOCUMENTS

| | | | |
|---|---|---|---|
| 4,317,628 | 3/1982 | Shimizu | 354/288 |
| 4,443,085 | 4/1984 | Tomori et al. | 354/286 |
| 4,448,509 | 5/1984 | Katsuma et al. | 354/286 |

OTHER PUBLICATIONS

"Flexible Circuits Bend to Designers' Will", Lyman, *Electronics*, Sep. 15, 1977, pp. 97-105.

*Primary Examiner*—Russell E. Adams
*Attorney, Agent, or Firm*—Toren, McGeady & Associates

[57] ABSTRACT

An information transmitting device between a camera body and an interchangeable objective therefor. An electrical circuit related to AF control in the camera body is fabricated in a flexible printed circuit board on back surface of a front panel of the camera housing to provide it in the unified form with the front panel. Information input and output pins for the circuit are positioned in the margin of an opening of the lens mount and on the front surface of the panel. A CPU chip is carried on an adjacent wing portion of the front panel to the pins and connected to the latter.

10 Claims, 4 Drawing Sheets

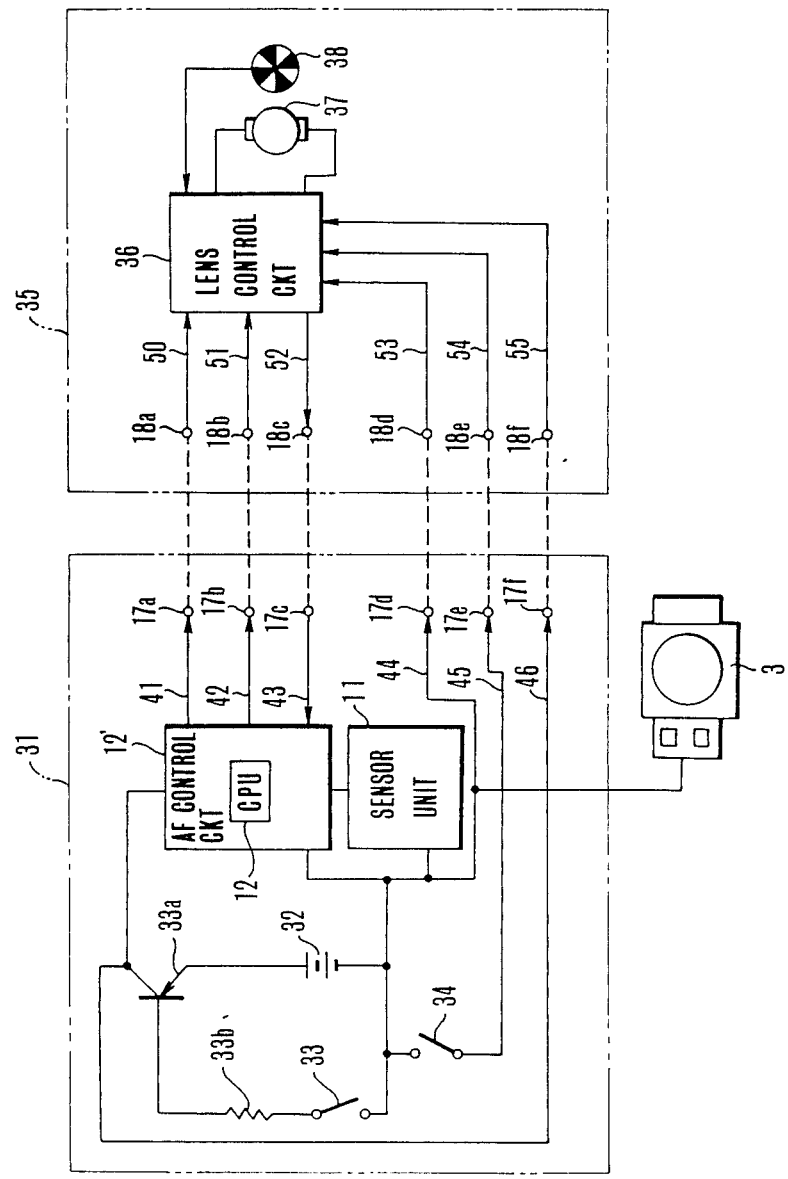

INFORMATION TRANSMITTING DEVICE FOR CAMERA

This is a continuation application of Ser. No. 211,086, filed June 21, 1988, which in turn is a continuation application of Ser. No. 828,957, filed Feb. 12, 1986 both now abandoned.

BACKGROUND OF THE INVENTION:

1. Field of the Invention:

This invention relates to an information transmitting device for a camera through which signals from the camera body are supplied to a photographic lens releasably attached thereto, or through which signals from the photographic lens are supplied to the camera body.

2. Description of the Prior Art:

Recently, as automation of controls of camera is advancing, particularly in the field of 35 mm lens shutter cameras, because, thanks to no need of interchanging the lens, the automatic focusing mechanism is easy to install between the lens and the camera body, autofocus type cameras have accounted for a majority. Meanwhile, even in the field of single lens reflex cameras, a system of a camera body having an automatic focusing mechanism incorporated therein with interchangeable lenses therefor has been realized. In this case, however, it is prerequisite to provide an information transmitting device between the camera body and any one of the interchangeable lenses.

Particularly in connection with the arrangement of the ones of the parts of the aforesaid information transmitting device which take their places in the camera body, many problems have been left unsolved. For example, how to electrically connect the AF control circuit to the sequence control circuit which is arranged in the conventional manner. How to allow for checking whether or not the circuitry of the information transmitting device in isolation works normally when in the assembly line of cameras or when to remedy the malfunction of the camera. Further, how to hold a chip element in the circuit of the information transmitting device, when in isolation, on the camera body.

The AF devices for cameras may roughly be classified into active and passive types, either of which, in the present state of art, has both merits and demerits depending on photographic situations. So, in actual practice, it is difficult to say which one is superior to the other. On this account, since, in the case of single lens reflex cameras, the internal mechanism of the camera body and the mounting mechanism of the interchangeable lens both are able to accommodate respective AF detecting mechanisms, a novel camera system can be considered that the AF detecting mechanism in the camera body is, for example, of the passive type, and the one in the interchangeable lens mounting is of the active type, thus acquiring inside and outside AF functions. And, this camera system is made to operate with selection of the passive and active AF detecting modes depending on the given photographic situation, so that, as the merits of either mode are enjoyed, best AF shooting can be made. However, in such a case, how to adapt that part of the information transmitting device which is in the camera body to selective use of two different kinds of interchangeable lenses one of which is associated with the AF detecting mechanism, and the other of which lacks it, will become a large problem in future.

SUMMARY OF THE INVENTION:

An object of the present invention is to provide an information transmitting device for a camera which has overcome the problem expected at the present time to become serious in future.

Other objects of the present invention will become apparent from the following detailed description of an embodiment thereof.

BRIEF DESCRIPTION OF THE DRAWINGS:

FIG. 4 is an electrical circuit diagram of the camera body and photographic lens in case when the photographic lens has no AF detecting mechanism.

Figure 1:
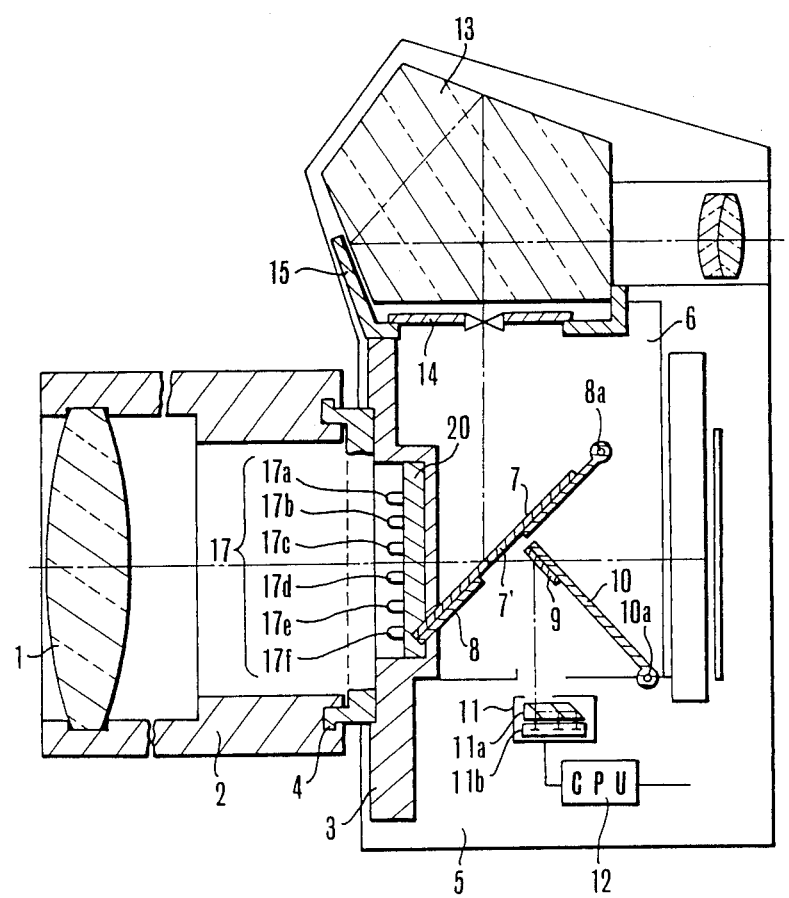
FIG. 1 is a schematic sectional view of an embodiment of an information transmitting device in a single lens reflex camera according to the present invention.
Figure 2:
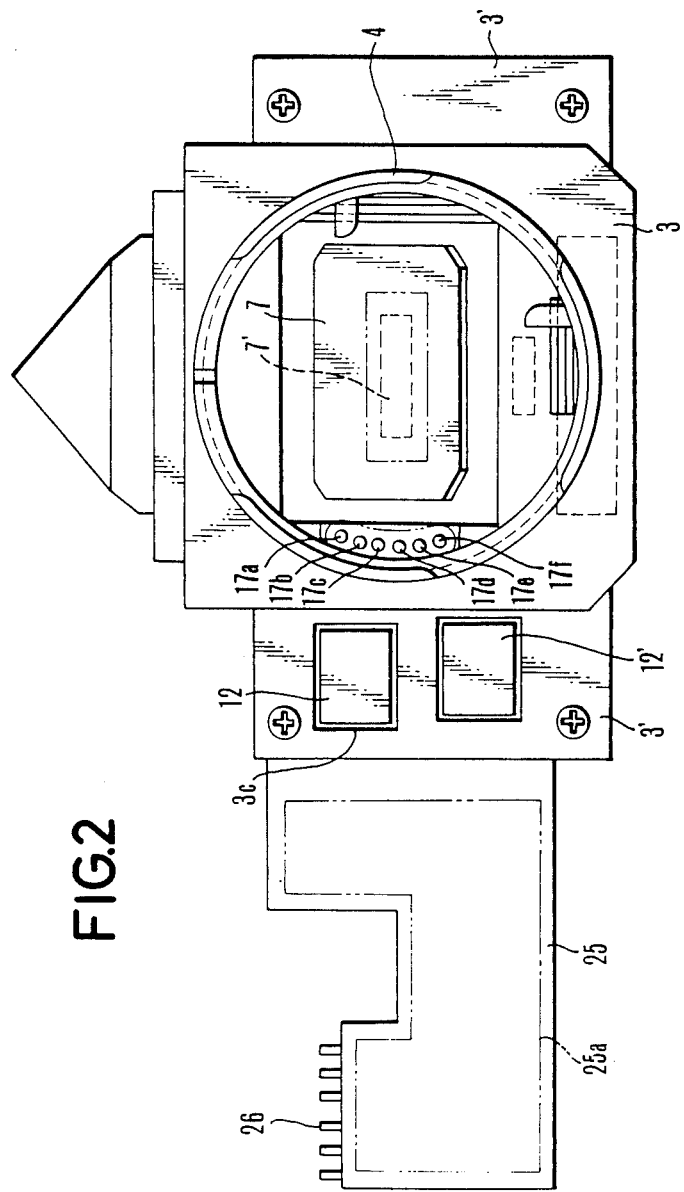
FIG. 2 is a front elevational view of a mirror box of the camera of FIG. 1.
Figure 3:
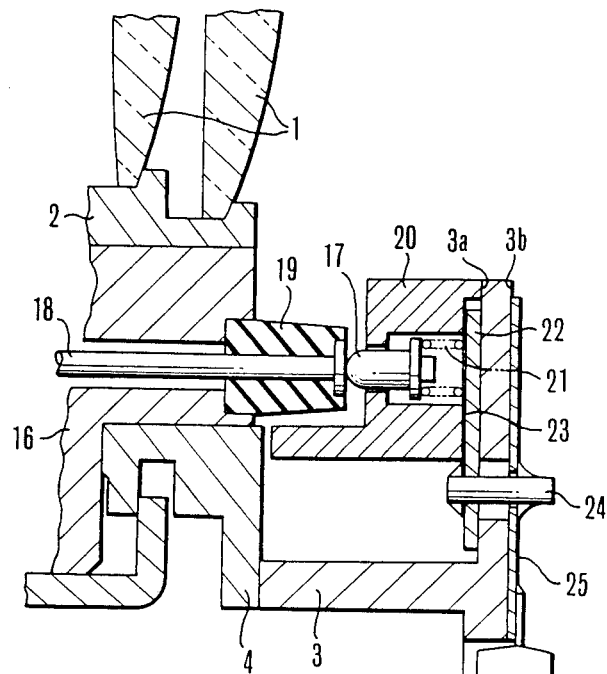
FIG. 3 is a fragmentary sectional view, in enlarged scale, of the coupling portions of the camera body and photographic lens.

DETAILED DESCRIPTION OF THE PREFERRED EMBODIMENTS:

FIGS. 1 to 3 illustrate the mechanical structure of an embodiment of the invention, where 1 is a photographic lens, 2 is a lens barrel, and 3 is a front panel having right and left wing portions 3' (see FIG. 2) formed as protruding therefrom. A flange-type lens mount 4 is fixedly secured to the front panel 3. A camera body 5 contains a mirror box 6 fixedly mounted to the front panel 3. A main mirror 7 in the box 6 is half-mirrored either in a central portion 7' of the area, or over the entire area and is supported on a bracket 8 pivotally mounted on a shaft 8a. The mirror 7 makes an angle of 45° with an optical axis of the photographic lens 1 in a viewing position of FIG. 1 and is moved by a mirror drive mechanism (not shown) in a clockwise direction to a retracted or non-viewing position. It should be noted that part of the bracket 8 which is aligned with the half-mirrored portion 7' is cut out to pass part of the light entering through the lens therethrough to an auxiliary mirror 9 and therefrom reflected downward to a sensor unit 11. A support 10 for the auxiliary mirror 9 is pivotable about a shaft 10a between an almost 45° position of FIG. 1, where AF detection is possible, and a retracted position as turned in a counterclockwise direction toward the sensor unit 11 by the mirror drive mechanism. The sensor unit 11 includes a beam splitter 11a and a photosensitive element 11b within a common casing. Using the output of this photosensitive element 11b, determination of the near-focus, far-focus or in-focus state of the photographic lens 1 to an object to be photographed is made. A CPU 12 for automatic focusing control includes a circuit for processing video signals from the sensor unit 11 and is arranged in fixedly secured relation to a location hole 3c in the left wing portion 3' of the front panel as viewed in FIG. 2. 12' is I/O. A pentagonal prism 13 and a focusing screen 14 are housed in a holder 15 fixedly secured to the mirror box 6. An outer barrel of a mounting for the photographic lens 1 has an adapter 16 releasably fitted in the lens mount 4.

Information transmitting pins 17a to 17f are axially movably supported on a holder 20 fixedly mounted to the inner surface of the lens mount 4 of the front panel 3 and positioned almost in a row at a slightly curved line as viewed from the front. Of the pins 17, the pins 17a to 17c are for AF information signals, the pin 17d is grounded, the pin 17e is for release signal, and the pin 17f is connected to a battery. An equal number of pins 18, other than pins 17, are provided in the mounting of the photographic lens 1. In more detail, all the pins 18a to 18f are positioned adjacent the adapter 16 in correspondence to the pins 17a to 17f, respectively, and are supported by an electrically insulating member 19. A printed circuit board 22 is positioned on the back side of the holder 20, and its patterns 23 are electrically connected to the information transmitting pins 17a to 17f through respective electrically conductive bias springs 21. The circuit for AF control including the CPU 12 is fabricated in another printed circuit board 25, which is flexible, on the back surface 3b of the front panel 3. Electrical connections between the CPU 12 and the aforesaid information transmitting pins 17a to 17f are realized by using electrically conductive rivets 24 across both boards 22 and 25 and the wall of the front panel 3. It should be noted that the flexible printed circuit board 25 are provided with interconnection terminals 26 for other main circuits (exposure control and display control circuits) of the camera body 5 as shown in FIG. 2, and fixedly carries a great number of chip elements (not shown) of small size on that part 25a which is not in contact with the front panel 3.

In this embodiment, the circuit for AF control including the CPU 12 is all fabricated in the flexible printed circuit board 25. This board is then put on the inner surface of the front panel 3, while the first printed circuit board 22 is placed on the outer surface of the panel 3 behind the information transmitting pins 17a to 17f. Then both boards 22 and 25 are fixedly secured to the panel 3 by the conductive rivets 24 of short length. This implies that the set of information transmitting pins 17a to 17f can be connected to the circuit for AF control including the CPU 12 through very short wire leads, giving an advantage of preventing the voltage level of the power supply line from dropping and the S/N ratio of the signal lines from deteriorating.

Also, since, as is understandable from FIGS. 1 to 3, the aforesaid information transmitting pins 17a to 17f are all provided inside the lens mount 4 and deep in the interior of the camera body 5 and the lens mount 4 and front panel 3, both of which are made of metal, are connected to circuit ground, the information transmitting pins 17 are shielded against external noise. Thus the possibility of occurrence of a faulty operating of the CPU 12 by such noise can be reduced to almost zero.

Also, since the circuit related to the AF control and the information transmitting pins 17 are all assembled in unified form on the front panel 3, for the electrical, optical checking and adjusting operations on the AF detection to be performed in the isolated state of the front panel 3, the operator needs only to probe the interconnection terminals 26 by using a tool which has an equivalent circuit to that of the camera body 5, and the information transmitting pins 17a to 17f by using another tool which has an equivalent circuit to that of the photographic lens mounting 1.

Also, since the chip element of large size having the CPU 12 is held by the wing portion 3', despite its base or printed circuit board 25 being very flexible, quick and easy handling of the unit of the front panel 3 in isolation becomes possible without suffering from breakage of the lead wires of the CPU 12 at its terminals. In other words, if the large chip element lies in the freely movable area 25a (not rigidly held by the front panel 3) and is many in number, the operator would have to be conscious of an extreme worry not to break the connection between the hard legs of the large chip elements and the lead wires therefor when the unit of the front panel 3 in isolation is subjected to electrical, optical check and adjustment on the AF detecting functions. This will lead to largely decrease the efficiency of production. But, in the foregoing embodiment of the invention, the large size chip element (CPU 12) is rigidly held by the wing portion 3' of the front panel 3 thereby that problem is eliminated. Another advantage arising from the use of the wing portion 3' for rigidly supporting the large size chip element (CPU 12) on the front panel 3 is that said wing portion 3' also serves as a base for use in checking the signals at the terminals of the chip element by probe pins.

Further, since the large size chip element (CPU 12) is mounted in inserted form into the location hole 3c of the wing portion 3' of the front panel 3, it is made possible to reduce the length of the protruded portion of the thickness of the chip element inwardly of the back surface of the front panel 3, contributing to a reduction of the size of the camera body.

Another contribution comes from the fact that the large size chip element (CPU 12) is not allowed to take its place at any position over the front panel 3 but its position is taken out of alignment with the lens mount 4, or limited to the wing portion 3'. If the large size chip element (CPU12) is positioned in alignment with the aforesaid information transmitting pins 17 and, therefore, with the lens mount 4, it would occupy the space which is assigned to the shutter operating mechanism or mirror drive mechanism, causing the longitudinal thickness of the camera body to increase. But in the embodiment of the invention, the large size chip element (CPU 12) is brought away from that space to the laterally extended portion or wing portion 3', thus avoiding the problem of increasing the size.

Referring next to FIG. 4, when a photographic lens having no AF detecting mechanism is attached to the camera body, an electrical circuit is established with a portion 31 thereof in the camera body and the remaining portion 35 in the photographic lens mounting. The circuit 31 comprises the sensor unit 11, the circuit 12' for AF control including the CPU 12 fabricated in the flexible printed circuit board 25, an electrical power source 32, a power switch 33 arranged to turn on when a release button is pushed down to a first stroke, a switching transistor 33a, a resistor 33b, and a release switch 34 arranged to turn on when the release button is further pushed down to the second stroke. Responsive to information representing the in-focus position, near-focus position, or far-focus position of an object detected by the sensor unit 11, the aforesaid AF control circuit 12' produces focusing control signals in the form of pulses representing the direction to the in-focus position and the speed of driving of an electric motor and a clock pulse signal at output lines 41 and 42. From an input line 43 the circuit 12' receives a signal representing the state of the photographic lens. Another output line 44 produces a ground level signal, another output line 45 produces a signal representing the state of the release switch 34, and another output line 46 produces a signal representing the voltage of the electrical power source 32. It should be noted that the ground level signal is supplied to the front panel 3.

Meanwhile, the circuit 35 in the photographic lens mounting comprises a lens control circuit 36, a lens drive motor 37 for driving motion of a distance adjusting ring (not shown) of said lens 1 in either of the normal and reverse directions, and a pulse disc 38 for detecting the axial position of the lens 1 as moved. This lens control circuit 36 has input lines 50, 51 and 53 to 55 upon reception of the signals from the output lines 41, 42 and 44 to 46 of the circuit 31 in the camera body to control the driving of the lens drive motor 37. On the other hand, the change of the forwardly moved amount of the lens resulting from the driving of the motor 37 is detected by the pulse disc 38, and its information is supplied through the output line 52 to the camera body side circuit 31.

The aforesaid output lines 41, 42 and 44 to 46 and input line 43 of the camera body side circuit 31 are brought into electrical conduction with the input lines 50, 51 and 53 to 55 and the output line 52 of the photographic lens side circuit 35 when the aforesaid information transmitting pins 17a to 17f contact with the information transmitting pins 18a to 18f in the lens mounting, respectively.

Figure 5:
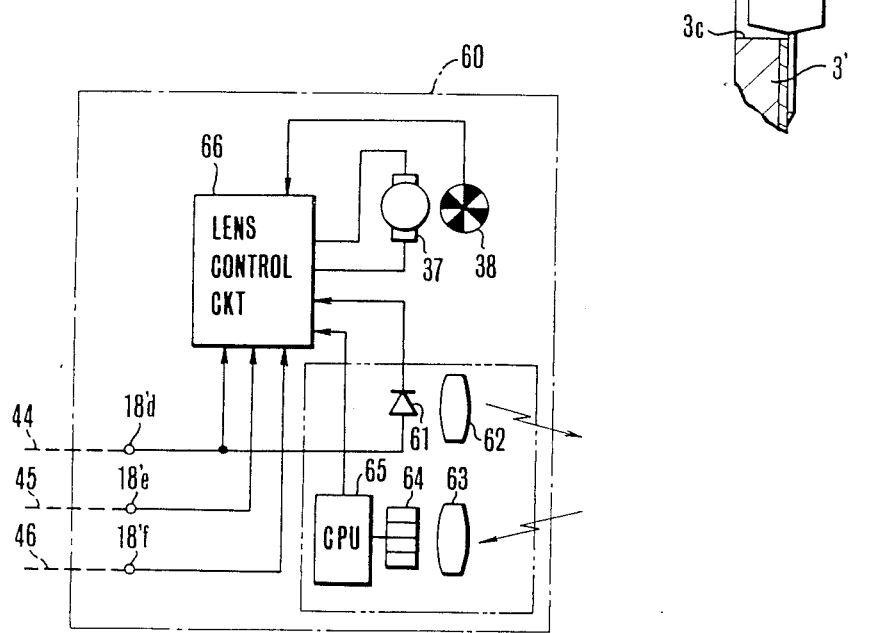
FIG. 5 is an electrical circuit diagram of the photographic lens in case when it has an AF detecting mechanism.

Referring next to FIG. 5, a circuit structure established when another photographic lens having an AF detecting mechanism arranged therein is attached to the camera body is explained. For note, because the camera body side circuit 31 is similar to that shown in FIG. 4, it is omitted here.

While what has been shown in FIG. 4 is an AF system of the only inside range finder type in which the AF detecting mechanism is provided in the camera body 5 alone, what is shown in FIG. 5 is a complex AF system operating with manual or automatic selection of the inside and outside range finder modes, as an additional AF detecting mechanism of the outside range finder type is provided in the photographic lens mounting 1 as well.

An outside range finder type AF system 60 in the photographic lens comprises a near infrared light-emitting diode 61, a projection lens 62 in front of the light emitting diode 61, a collection lens 63 positioned to receive the reflection of the near infrared light from an object to be photographed, a sensor 64 positioned behind the collection lens 63, an AF control CPU 65 for processing the output signals of the sensor 64, a lens control circuit 66 and a lens drive motor 37 and a pulse disc 38 similar to those shown in FIG. 4. This AF system utilizes the principle that the angle of incidence of the reflection varies as a function of the object distance in controlling the amount of forward movement of the photographic lens 1 in accordance with that measured object distance, and is made, with inclusion of the AF control circuit, arranged in the photographic lens mounting to receive only the ground signal, battery voltage signal and release actuating signal from the camera body 5. It should be noted that the input signals from the camera body 5 are received when the output lines 44 to 46 are in contact with the information transmitting pins 18′d to 18′f. Therefore, the photographic lens 60 of FIG. 5 is usable also with the camera body 31 of the first embodiment of FIG. 4 as a matter of course, and further even with the camera body 5 having no AF control circuit.

It should be noted that of the plurality of information transmitting pins 17a to 17f, pins necessary to both the AF system, namely, the pins 17d to 17f are grouped as one set and positioned adjacent each other as in the foregoing embodiment, thereby giving an advantage of assuring interchangeability of photographic lenses of different kinds. That is, the arrangement of pins of the plurality of information transmitting pins 17a to 17f of the camera body 5, which are necessary in common between the photographic lens of the kind shown in FIG. 4 and the photographic lens of the kind shown in FIG. 5, namely, the pins 17d to 17f in a series of continguous respective positions to each other, allows the two kinds of photographic lens mountings to have common parts, leading to reduction in the production cost.

It should be noted that since, in the embodiment of the invention, static electricity is discharged exclusively to the ground signal transmitting pin 17d whose potential is far lower than that of the adjacent pins for the input and output lines 41 to 43, the CPU 12 is protected against damages by static discharge, as it is general that static electricity from the outside is discharged to the tips of the information transmitting pins and this is propagated to destroy the gate of the CPU 12.

As has been described above in greater detail, according to the present invention, the circuit related to the AF control of the camera body is assembled with the front panel in a unified form, thereby it being made possible to perform checking and adjusting of the electrical and optical parts for AF detection when the front panel is in isolation. Further, the CPU or like large size chip element is rigidly held at the wing of the front panel to facilitate quickness and easiness of handling the front panel unit particularly when in isolation, and also to eliminate the problem of breaking the lead wires of the legs of that element during handling. Thus, the invention is able to provide such improvements of the information transmitting device for camera.

Also, in the embodiment of the invention, pins of the plurality of information transmitting pins of the camera body, which are necessary in common to a variety of interchangeable photographic objectives of different AF system, are arranged in one set at contiguous respective positions to each other in order to insure that the different photographic objectives are interchangeable with one another.

What is claimed is:

1. An information transmitting device for a camera body incorporated with a detachable front panel construction unifying therein a focal detection device including an AF optical system and a light sensor, comprising:
    (a) a circuit for AF control in said camera body;
    (b) a circuit for camera sequence control other than said AF control in said camera body;
    (c) a flexible printed circuit board having said circuit for AF control fabricated therein, said board being mounted on a wing portion of said front panel construction;
    (d) camera side signal transmitting pins electrically connected to circuit patterns on said flexible printed circuit board, said pins being arranged, upon attachment of a photographic lens to said camera body, to contact with signal transmitting pins of said photographic lens, so that electrical signals related to the AF control are transmitted therebetween; and (e) a large size chip element electrically connected to said flexible printed circuit board and substantially rigidly held in said wing portion in said front panel construction, said large size chip element overlapping with said wing portion and having a connection terminal formed on both sides to connect said board.

2. A device according to claim 1, wherein said camera sequence control circuit includes at least an electrical power line, a ground line and a release actuating signal line.

3. A device according to claim 1, further comprising: a lens mount fixedly secured to said front panel, construction whereby said camera side signal transmitting pins are arranged in the inside of said mount.

4. An information transmitting device for a camera body incorporated with a detachable front panel construction unifying therein a focal detection device including an AF optical system and a light sensor, comprising:
(a) a circuit for AF control in said camera body;
(b) a circuit for camera sequence control other than said AF control in said camera body;
(c) a flexible printed circuit board having said circuit for AF control fabricated therein, said board being mounted on a wing portion of said front panel construction;
(d) camera side signal transmitting pins electrically connected to circuit patterns on said flexible printed circuit board, said pins being arranged, upon attachment of a photographic lens to said camera body, to contact with signal transmitting pins of said photographic lens, so that electrical signals related to the AF control are transmitted therebetween; and
(e) a large size chip element electrically connected to said flexible printed circuit board and substantially rigidly held in said wing portion in said front panel construction, said large size chip element overlapping with said wing portion and having a connection terminal formed on both sides to coneect said board, wherein said front panel construction is formed by an electrically conductive member, and is electrically connected to circuit ground.

5. A device according to claim 3, where said front panel construction is formed by an electrically conductive member, and is electrically connected to circuit ground.

6. A device according to claim 1, wherein said large size chip element on said flexible printed circuit board is held by a location hole in said wing portion.

7. A device according to claim 1, wherein said camera side signal transmitting pins produce a driving signal representing the direction to an in-focus condition.

8. A device according to claim 2, wherein said camera side signal transmitting pins produce a driving signal representing the direction to an in-focus condition, a battery signal and a ground signal.

9. An information transmitting device for a camera comprising:
(a) a camera body having a focus detecting device including a light sensor incorporated therein;
(b) a first photographic lens having a focus detecting device including a light sensor incorporated therein;
(c) a second photographic lens having no focus detecting device including a light sensor incorporated therein;
(d) first lens side signal transmitting pins arrange in said first photographic lens;
(e) second lens side signal transmitting pins arranged in said second photographic lens; and
(f) a plurality of camera side signal transmitting pins arranged almost in a row in said camera body, said camera side signal transmitting pins having a first pin arrangement for connection with said first lens side signal transmitting pins, and a second pin arrangement for connection with said second side signal transmitting pins, both of said pin arrangments having common transmitting pins for duplicated signals, and said common transmitting pins being grouped in one set and arranged to one side.

10. A device according to claim 9, wherein said camera side signal transmitting pins include at least a pin for producing a signal for driving said photographic lens toward in-focus, a pin for producing a battery signal, a pin for producing a ground signal and a pin for producing a release start signal, and of these pins, said battery signal producing pin, said ground signal producing pin and said release start signal producing pin are grouped in one set and arranged to one camera side.

* * * * *